May 14, 1957 T. W. LLOYD 2,792,139
PORTABLE WHEEL-ASSEMBLY HOIST
Filed March 7, 1955 3 Sheets-Sheet 1

Thomas W. Lloyd
INVENTOR.

BY *Clarence A. O'Brien*
*and Harvey B. Jacobson*
Attorneys

May 14, 1957 T. W. LLOYD 2,792,139
PORTABLE WHEEL-ASSEMBLY HOIST
Filed March 7, 1955 3 Sheets-Sheet 2

Thomas W. Lloyd
INVENTOR.

BY Clarence A. O'Brien
and Harvey B. Jacobson
Attorneys

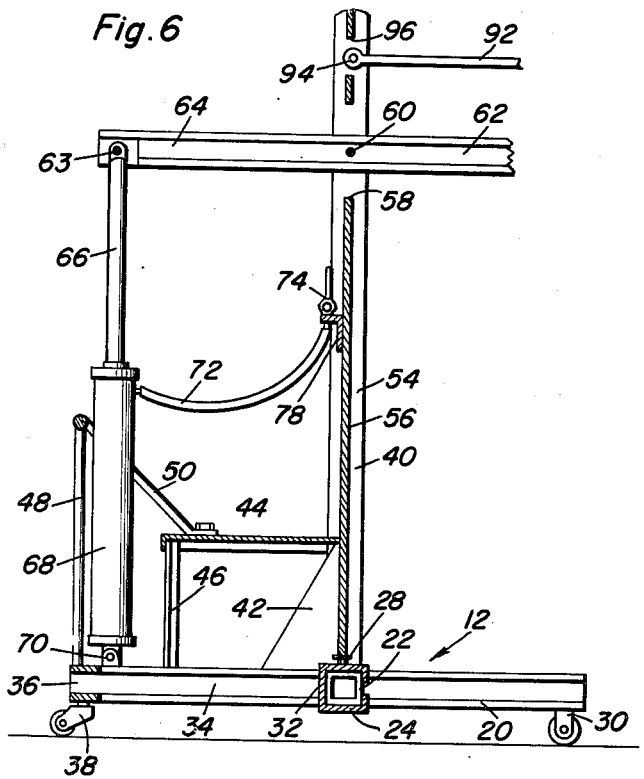
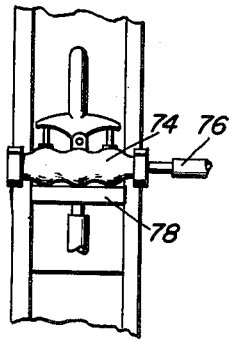
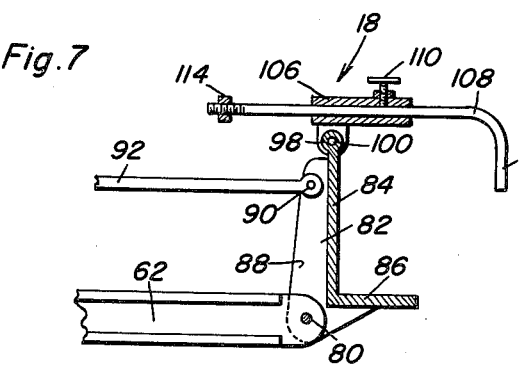
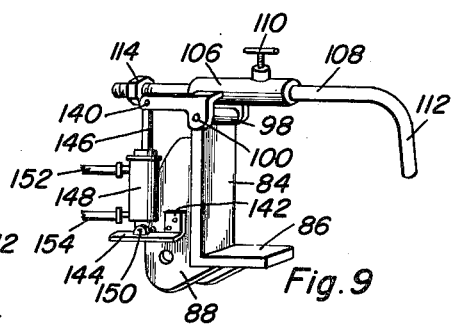
Thomas W. Lloyd
INVENTOR.

United States Patent Office 2,792,139
Patented May 14, 1957

2,792,139

PORTABLE WHEEL-ASSEMBLY HOIST

Thomas W. Lloyd, Sutherlin, Oreg.

Application March 7, 1955, Serial No. 492,389

2 Claims. (Cl. 214—147)

This invention relates generally to the apparatus used in handling wheel-assemblies on a truck, and is more particularly concerned with the removal of exceptionally large wheel assemblies such as those used on logging and lumber trucks, trailers, etc.

The primary object of the invention is to provide a portable wheel-assembly hoist to assist in the removal and replacing of the tire and wheel assembly of a trailer or any vehicle while the trailer is either on the ground or when the trailer is loaded on a truck bed in transit, being carried "piggy-back" on another truck or "low-boy" trailer.

A further object of invention in conformance with that set forth above is to provide in a portable wheel-assembly a positive locking device to grip the tire and wheel-assembly loosely so that the wheel lug bolts can be aligned when the same is remounted on a wheel of a trailer.

A further object of the invention in conformance with those set forth above is to provide in a portable wheel-assembly an adjustable gripping device which is adjustable for various sized tires, and which is power operated utilizing any suitable source of fluid pressure.

And still another object of invention in conformance with those set forth above is to provide in a portable wheel-assembly hoist of the character set forth means permitting the person utilizing the same to have access to the wheel-assembly being handled by the device.

And still a further object of invention in conformance with those set forth above is to provide a highly utilitarian, readily portable, and relatively simple to operate wheel-assembly hoist including an adjustable base for accommodation to the location of various wheel-assemblies being handled on the hoist in order that the wheel assembly will be centrally located relative to the hoist mechanism.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 6 is a sectional view taken substantially on line 6—6 of Figure 4;

Figure 7 is an enlarged sectional view taken substantially on line 7—7 of Figure 3;

Figure 8 is an enlarged fragmentary view showing a typical control valve mechanism which might be utilized in the hoist; and Figure 9 is a perspective view illustrating another embodiment of the gripping jaws utilized in the novel hoist wherein power means are incorporated in the same.

The novel hoist is indicated generally at 10 and generally includes a base assemby 12 preferably carrying thereon a pivotal lever assembly 14 operably connected at one end to a fluid motor assembly 16 and including on its other end adjustable wheel gripping assembly 18.

Figure 4:
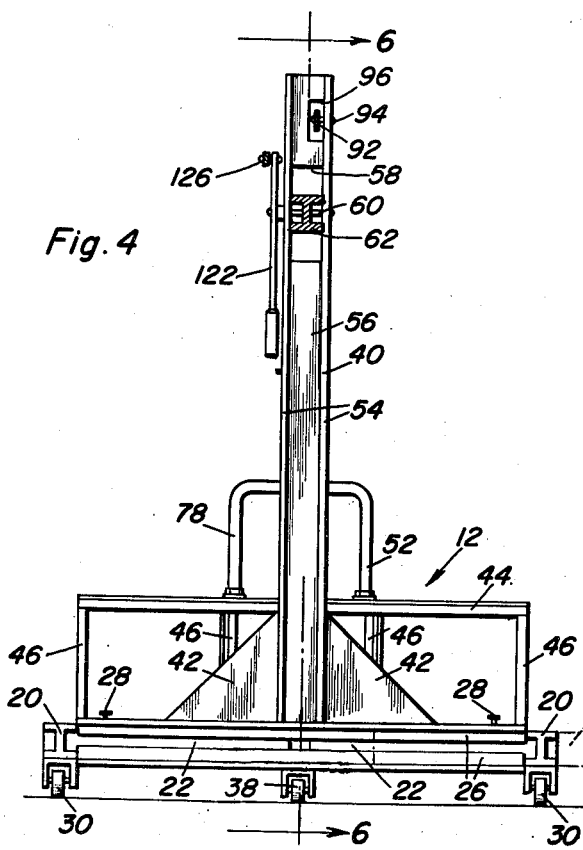
Figure 4 is a sectional view taken substantially on line 4—4 of Figure 3.

The base assembly 12 is constructed of structural steel elements, for example, I-beam elements as seen in Figure 4, and includes a pair of parallel leg members 20 each including right angled inwardly extending adjustable leg portions 22, which are adjustably secured to a transverse support member 24. The transverse member 24 includes longitudinally extending flange portions 26 for retaining the legs 22 to the member 24, and includes on the upper surface thereof suitable fastening elements 28 for retaining the claims 20 in their adjusted position. Secured on the underside of the leg members are wheel assemblies 30, of any suitable character. Secured on the rear side 32 of the transverse member 24 are a pair of diverging leg elements 34 which form the equilateral sides of a triangular rear end of the base converging to define an apex portion 36. Secured on the underside of the apex portion 36 is a suitable caster wheel assembly 38, permitting ready adjustment in the position of the wheel-assembly hoist. The base includes centrally of the transverse member 24 an upwardly extending pivotal support member 40 which may be reinforced thereon relative to the elements 34 by means of suitable gusset plates 42. A suitable support platform 44 extends rearwardly from the vertical support 40 including the downwardly extending support elements 46 which are located between the platform 44 and the elements 34 and the transverse member 24. A handle member 48 extends upwardly from the apex portion 36 of the base and includes forwardly extending portions 50 which are secured on the horizontal base 44 by means of suitable fastening elements 52.

The upwardly extending pivotal support element 40 is also a structural steel member which includes side portions 54 joined by a transverse web portion 56. The web 56 has a portion removed to define a vertical slotted portion 58 most clearly seen in Figure 4. Located within the cut-out portion 58 is a transverse pivot pin 60 which extends between the sides 54 of the support element 40, and which has pivotally supported thereon the pivotal support lever assembly 14.

The pivotal support lever assembly 14 includes an intermediately pivoted beam element 62, which may be of I-beam configuration, and which has pivotally connected at 63 at its rear end portion 64 a piston rod 66 of a fluid motor 68 which is pivotally connected in any suitable manner at 70 to the upper surface of the apex portion 36 on the base member 12.

The fluid motor 68 although being disclosed as being of the single-acting type, may be double-acting fluid motor depending upon the degree of control desired. A suitable fluid conduit 72 is connected to the fluid motor 68 for moving a fluid piston (not shown) in the fluid motor 68, the fluid pressure being controlled by a suitable valve control mechanism 74, as seen in Figure 8, said valve control mechanism being connected to any suitable outside source of fluid pressure 76, which may be a pneumatic pressure source such as generally found around service stations. The control valve 74, it will be noted, is suitably supported on a bracket member 78 carried on a rear portion of the support element 40.

Figure 1:
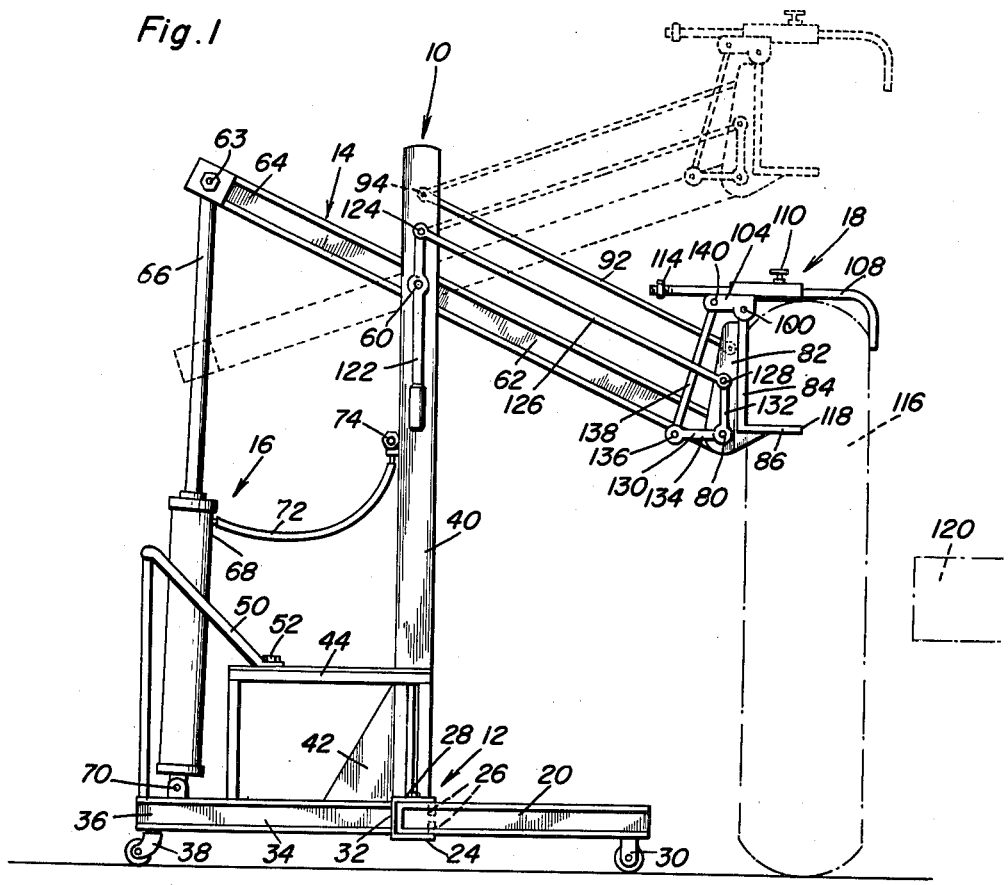
Figure 1 is a side elevational view of the novel wheel-assembly hoist showing in dotted lines a trailer bed from which the wheel assembly has been removed, and further showing the raised position of the wheel-assembly gripping means.
Figure 5:
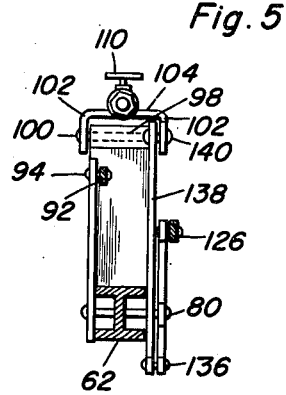
Figure 5 is an enlarged sectional view taken substantially on line 5—5 of Figure 3.

Pivotally connected on a pivot pin 80 on the other end of the member 62 is the wheel gripping assembly 18, The gripping assembly 18 includes a head portion 82 which includes a vertically extending portion 84 and a horizontally extending portion 86 having a cross-sectional configuration of an L. Extending from the head portion 82 is a rearwardly directed spaced flange 88, the lower portion of which are pivotally secured to the previously mentioned pivot pin 80 and the upper portion having pivotally secured on the pivot pin 90 to a guide rod 92 which is pivotally connected on a pivot pin 94 which extends transversely in an aperture portion 96 to the flange 56 on the support element 40. By virtue of the pivotal connections at 60, 80, 94 and 90, there is defined a parallelogram wherein when the beam 62 is either raised or lowered, as shown in Figure 1, the vertical portion 84 of the head element 82 is retained in substantially a parallel position relative to the vertical support element 40. As seen in Figure 5, the vertical portion 84 and the head element 82 comprises a transverse tubular sleeve 98 which has extending therethrough a transverse pivot pin 100 pivotally supported thereon the downwardly extending legs 102 of a pivotal lever element 104. Suitably secured transversely of the element 104 is a tubular element 106 which reciprocably supports therein a tire gripping element 108, secured therein by means of a suitable adjusting screw 110, said tire and gripping element 108 including a downwardly extending tire engaging portion 112, having suitably secured on a rear portion a retaining nut 114 for preventing the accidental removal or loss of the element 108 out of the tubular support 106. By virtue of the adjusting screw 110, the element 108 may be moved in the support sleeve 106 to accommodate the positioning of a tire 116 between the element 108, wherein the wheel portion of the tire will be in contact with the outer end 118 on the horizontal portion 86 of the gripping head element 82. It is thus believed apparent that a wheel and tire assembly which is supported in the gripping head 18 may be rotated therein for the purpose of orienting the wheel lugs with the proper apertures in the wheel assembly. It is also believed apparent that by virtue of the vertical pivotal movement of the beam 62 through the medium of a control valve 74 and the fluid motor 68, a wheel assembly including the tire 116 may be raised from the trailer bed 120 wherein said wheel assembly would previously have been mounted on a vehicle carried by said trailer bed, in a relatively simple and expedient manner, without necessitating the mechanic removing said wheel assembly to place himself in a precarious and dangerous position on the trailer bed in order to remove the previously mentioned wheel assembly.

Figure 2:
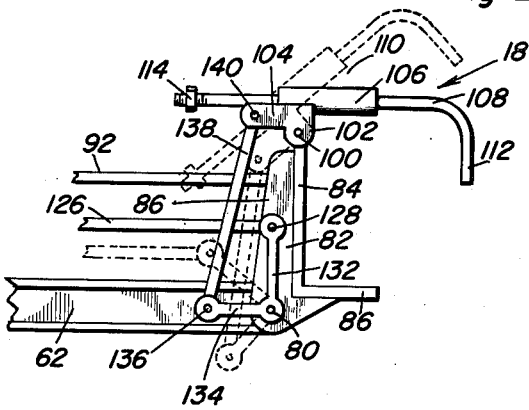
Figure 2 is an enlarged side elevational view of a portion of Figure 1, showing the adjustable gripping jaw mechanism.
Figure 3:
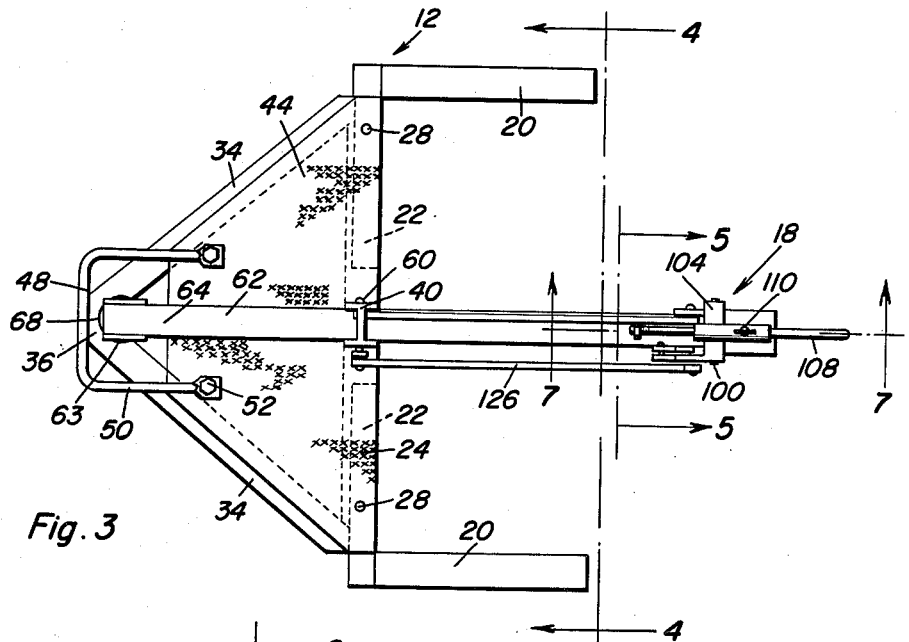
Figure 3 is a top plan view of a wheel-assembly hoist.

The element 104 is pivoted about the pivot pin 100 as previously mentioned, by means of an actuating handle 122 which is pivotally carried on the pivot pin 60 and the exterior of the support element 40, said handle 122 having pivoted on a pivot pin 60 a force transmitting rod 126 which is pivotally connected at 128 to a bell crank element 130. The bell crank element 130 includes a vertical portion 132 which pivotally carries the force transmitting rod 126, and a horizontal leg portion 134 pivotally carrying on a suitable pin 136 a lever element 138 pivotally connected on a pivot pin 140 connected to a rearwardly extending portion of the element 104. It is apparent, as seen in Figure 2, that by rotating the handle 122 in a counter-clockwise direction, the element 108 will be raised to the position shown by the dotted lines in Figure 2, permitting the movement of the gripping head 18 to move over the top of the tire 116 of a wheel assembly which is to be removed from a vehicle.

Although the operation of the apparatus is believed obvious, it will be seen that the base or legs of the base 20 are suitably spaced by means of the adjusting screws 28 to accommodate for dual wheels, for example, on the trailer bed, wherein the wheel-assembly to be removed by the novel hoist is located substantially centrally of the gripping head 18. The beam 62 is raised substantially into the position shown in dotted lines in Figure 1, the gripping assembly 18 is pivoted into position shown by the dotted lines in Figure 2, the device is moved into position to be secured to a wheel-assembly shown in Figure 1. After the lug nuts are removed from the wheel-assembly which is positioned on the trailer bed, for example, and the vehicle thereon has been jacked up, the novel hoist may be moved away from the trailer bed and the wheel-assembly may be lowered to the ground as seen in Figure 1.

The gripping head disclosed in Figure 9, includes substantially all of the structure of that described in the previous embodiment, however, the flange 88 includes on one side thereof a suitably secured bracket element 142 which provides a horizontal flange 144. Replacing the lever 138 of the previous embodiment, is a piston rod 146 of a double-acting fluid cylinder 148 which is pivotally connected at 150 to the horizonal flange 144. Suitable fluid conduits 152 and 154 are connected to suitable control means (not shown), and this fluid cylinder 148 serves the same function as the manually controlled lever 122 of the previously described embodiment.

Thus, it is believed that there has been disclosed a novel portion wheel-assembly hoist, fully conforming with the objects of invention heretofore set forth.

Various positional directional terms such as "front," "rear," "top" and "bottom," are utilized herein to have a relative connotation to aid in describing the device and are not intended to be interpreted as requiring any particular orientation of the device with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A portable hoist for lifting a heavy duty wheel comprising a base having supporting wheels, a vertical support on said base, a tire lifting head at one side of the support having a horizontal portion for underlying the inner circumferential portion of a wheel to lift the same, and a vertical portion for engaging one side of a wheel to establish the underlying position of said horizontal portion, a beam pivoted to said support and said vertical portion and vertically swingable to lift said head, a rod above and parallel with said beam and pivoted to said support and to said vertical portion to maintain said head vertical during swinging of said beam, a wheel gripping member, means pivotally mounting said member on said vertical portion above said horizontal portion for vertical swinging into and from overlying gripping relation to a wheel, a bellcrank pivoted on said head, operating connections between said bellcrank and member for swinging said member by said bellcrank, a hand lever pivoted on said support, an operating connection between said hand lever and bellcrank, and power means carried by said base for swinging said beam.

2. The combination of claim 1, said operating connections comprising a rod pivoted to said bellcrank and to the means pivotally mounting said member.

References Cited in the file of this patent
UNITED STATES PATENTS

| | | |
|---|---|---|
| 1,374,986 | Carter | Apr. 19, 1921 |
| 2,225,787 | McDermott et al. | Dec. 24, 1940 |

FOREIGN PATENTS

| | | |
|---|---|---|
| 294,774 | Great Britain | Aug. 2, 1928 |